United States Patent [19]
Ishikawa

[11] Patent Number: 5,591,355
[45] Date of Patent: Jan. 7, 1997

[54] METHOD FOR CONTROLLING RESISTANCE WELDING USING FUZZY REASONING

[75] Inventor: Sakae Ishikawa, Chiba-ken, Japan

[73] Assignee: Miyachi Technos Corporation, Chiba-ken, Japan

[21] Appl. No.: 386,090

[22] Filed: Feb. 9, 1995

[30] Foreign Application Priority Data

Feb. 25, 1994 [JP] Japan .................................. 6-053034

[51] Int. Cl.$^6$ .................................................. B23K 11/24
[52] U.S. Cl. ........................................ 219/110; 219/117.1
[58] Field of Search .................................. 219/110, 108, 219/109, 117.1; 395/900, 61

[56] References Cited

U.S. PATENT DOCUMENTS

| | | | |
|---|---|---|---|
| 3,546,421 | 7/1968 | Meyer et al. | 219/110 |
| 5,270,516 | 12/1993 | Hamamoto et al. | 219/130.21 |

*Primary Examiner*—Clifford C. Shaw
*Attorney, Agent, or Firm*—Wenderoth, Lind & Ponack

[57] ABSTRACT

A method for controlling resistance welding adaptively optimizes a set value of welding current for the next welding operation by inference from monitored signals of the present welding operation. In an embodiment, a welding current I and a change of resistance ΔR across welding electrodes are measured during a welding operation. The number of welding operations N involving the welding electrodes is incremented. After the present welding operation, these values of ΔR, I and N are mapped into compatibility degrees of respective antecedent membership functions. Compatibility degree of conclusion membership function of each control rule is computed from its antecedent membership function compatibility degrees. Then compatibility degree of conclusion membership functions U, S and D is composed. From the composed compatibility degree, an operation value i.e., percent change of set welding current is computed by the center of gravity defuzzification method. Finally, using the percent change, the set value of welding current is corrected. The corrected set welding current is used for the next welding operation.

4 Claims, 7 Drawing Sheets

| CHANGE OF RESISTANCE ΔR | WELDING CURRENT I | | | | | | | | |
|---|---|---|---|---|---|---|---|---|---|
| | $I_L$ | $I_M$ | $I_H$ | $I_L$ | $I_M$ | $I_H$ | $I_L$ | $I_M$ | $I_H$ |
| $\Delta R_L$ | (w1) U | (w4) U | (w7) U | (w10) U | (w13) U | (w16) U | (w19) U | (w22) U | (w25) S |
| $\Delta R_M$ | (w2) S | (w5) S | (w8) S | (w11) S | (w14) S | (w17) S | (w20) S | (w23) S | (w26) D |
| $\Delta R_H$ | (w3) D | (w6) D | (w9) D | (w12) D | (w15) D | (w18) D | (w21) S | (w24) D | (w27) D |
| | $N_L$ | | | $N_M$ | | | $N_H$ | | |
| | NUMBER OF WELDING OPERATIONS N | | | | | | | | |

METHOD FOR CONTROLLING RESISTANCE WELDING USING FUZZY REASONING

SUMMARY OF THE INVENTION

It is, therefore, an object of the invention to provide a method for controlling resistance welding capable of always providing a good weld quality without relying on the skill of a field operator by monitoring each welding operation and using the monitored results to infer a set value of welding current for the next welding operation.

In accordance with the invention a first method for controlling resistance welding comprises the steps of (a) setting a plurality of antecedent membership functions for respective degrees of a change of resistance across welding electrodes under welding operation (b) setting a plurality of conclusion membership functions corresponding to the antecedent membership functions for respective degrees of a change rate of a set value of welding current (c) detecting the change of resistance across the welding electrodes during a welding operation, and (d) correcting the set value of welding current for the next welding operation based on the detected change of resistance in accordance with the antecedent membership functions and the conclusion membership functions.

A second method for controlling resistance welding in accordance with the invention comprises the steps of (a) setting a plurality of first antecedent membership functions for respective degrees of a change of resistance across welding electrodes under welding operation (b) setting a plurality of second antecedent membership functions for respective degrees of a change rate of a welding current under welding operation (c) setting a plurality of conclusion membership functions corresponding to the first and second antecedent membership functions for respective degrees of a change rate of a set value of welding current (d) detecting the change of resistance across the welding electrodes during a welding operation (e) measuring the welding current during the welding operation, and (f) correcting the set value of welding current for the next welding operation based on the detected change of resistance and the measured welding current in accordance with the first and second antecedent membership functions and the conclusion membership functions.

A third method for controlling resistance welding in accordance with the invention comprises the steps of (a) setting a plurality of first antecedent membership functions for respective degrees of a change of resistance across welding electrodes (b) setting a plurality of second antecedent membership functions for respective degrees of a number of welding operations involving the welding electrodes (c) setting a plurality of conclusion membership functions corresponding to the first and second antecedent membership functions for respective degrees of a change rate of a set value of welding current (d) detecting said change of resistance across the welding electrodes during a welding operation (e) counting the number of welding operations involving the welding electrodes, and (f) correcting the set value of welding current for the next welding operation based on the detected change of resistance and the counted number of welding operations in accordance with the first and second antecedent membership functions and the conclusion membership functions.

A fourth method for controlling resistance welding of the invention comprises the steps of (a) setting a plurality of first antecedent membership functions for respective degrees of a change of resistance across welding electrodes under welding operation, (b) setting a plurality of second antecedent membership functions for respective degrees of a welding current under welding operation, (c) setting a plurality of third antecedent membership functions for respective degrees of a number of welding operations involving the welding electrodes, (d) setting a plurality of conclusion membership functions corresponding to the first, second and third antecedent membership functions for respective degrees of a change rate of a set welding current, (e) detecting the change of resistance across the welding electrodes during a welding operation, (f) measuring the welding current during the welding operation, (g) counting the number of welding operations involving the welding electrodes, and (h) correcting the set welding current for the next welding operation based on the detected change of resistance, the measured welding current and the counted number of welding operations in accordance with the first, second and third antecedent membership functions and the conclusion membership functions.

The present method for controlling resistance welding of the invention performs Fuzzy reasoning in response to each welding operation, and optimizes a set value of welding current for the next welding operation. An input variable or monitored signal to rule antecedents of Fuzzy reasoning comprises a change of resistance across the welding electrodes in the first method. It comprises a change of resistance across the welding electrodes and a measured welding current in the second method. The third method monitors a change of resistance across the welding electrodes and a number of welding operations. The fourth method monitors a change of resistance across the welding electrodes, a measured welding current and a number of welding operations. An output or control variable from rule conclusions of Fuzzy reasoning comprises the set value of welding current. The method of the invention determines the rate of change of the set value of welding current by Fuzzy reasoning e.g., Max-Min method.

BRIEF DESCRIPTION OF THE DRAWINGS

The above and other objects and advantages of the invention will become more apparent from the following description taken in conjunction with the drawings in which.

DETAILED DESCRIPTION OF PREFERRED EMBODIMENT

Figure 1:
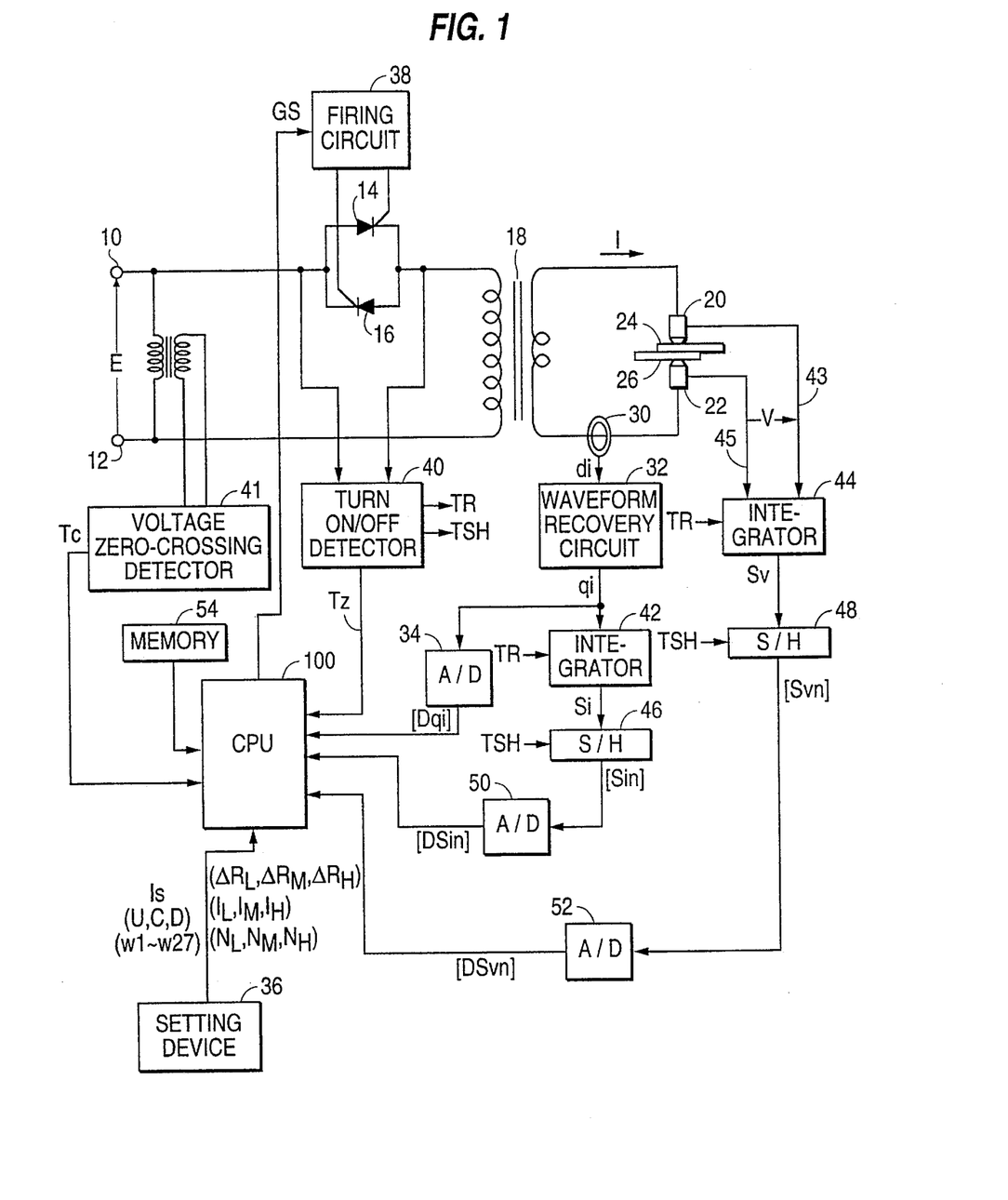
FIG. 1 is a block diagram of an arrangement of a resistance welding machine and control to which a control method of the invention applies.
Figure 2:
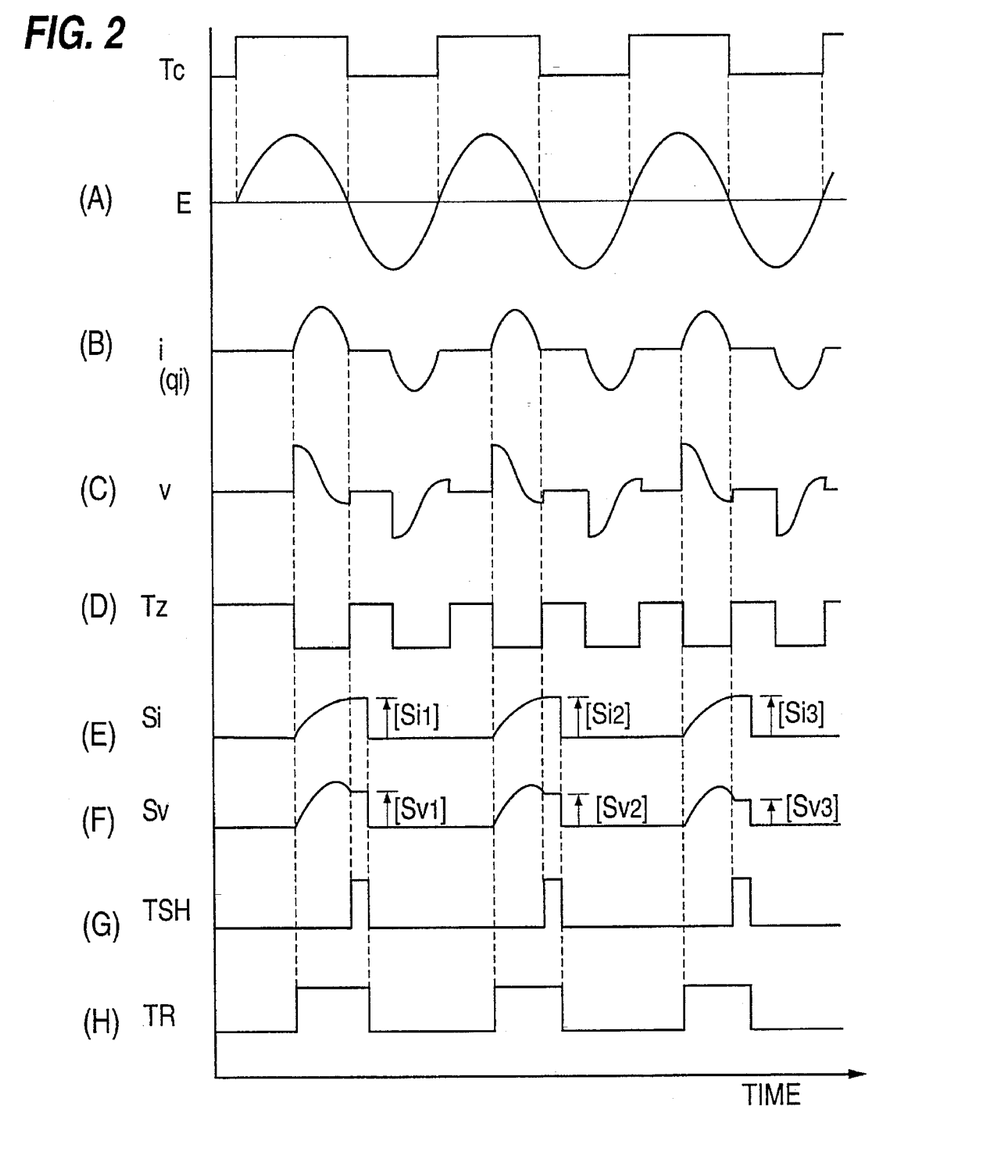
FIG. 2 is a diagram showing signal waveforms at various parts in FIG. 1.

Referring to FIG. 1, there is shown an arangement of a resistance welding machine together with a control to which the control method of the invention applies. FIG. 2 shows signal waveforms at various parts in FIG. 1. The resistance welding machine in FIG. 1 takes the form of a single-phase alternating current resistance welding machine.

The input terminals 10 and 12 of the resistance welding machine receive an AC voltage E of commercial frequency (FIG. 2(A)). During a welding operation, the voltage is supplied to the primary coil of the welding transformer 18 by means of a pair of thyristors 14 and 16. The secondary voltage induced in the secondary coil of the welding transformer 18 applies across workpieces 24 and 26 by way of a secondary line and a pair of welding electrodes 20 and 22. As a result, a welding current I (FIG. 2(B)) flows through the secondary circuit.

A toroidal coil 30 is provided in the secondary circuit to detect the welding current I. The toroidal coil 30 generates a signal di having a derivative waveform of the welding current I. The toroidal coil signal di is supplied to a waveform recovery circuit 32 consisting of an integrator. The waveform recovery circuit 32 outputs a welding current signal qi(FIG. 2 (B)) having the waveform or instantaneous value of the welding current I. An analog-to-digital (A/D) converter 34 converts the welding current signal qi to a corresponding digital signal[Dqi] which is inputted to CPU 100.

CPU 100 controls the firing angle of the thyristors 14 and 16 by means of a firing circuit 38 such that the measured welding current qi matches the set value of welding current Is from setting device 36.

For the firing angle control, voltage zero-crossing detector 41 and turn-on/off detector 40 supply timing signals Tc and Tz(FIG. 2(D)), respectively, to CPU 100. The voltage zero-crossing detector 41 detects zero-crossing of the supply voltage, thus generating a firing control timing signal Tc in the form of a polarity-inverting pulse. The turn-on/off detector 40 detects start and end of the welding current of each half cycle from the voltage across the thyristor which steps down in response to the start of the welding current and steps up in response to the stop of the welding current. The turn-on/off detector 40 generates a timing signal TSH (FIG. 2 (G)) for sampling/holding and a timing signal TR (FIG. 2 (H)) for resetting integrator.

The combination of toroidal coil 30, waveform recovery circuit 32, A/D converter 34, setting device 36, CPU 100, turn-on/off detector 40, firing circuit 38, voltage zero-crossing detector 41 and thyristors 14, 16 provides a feedback control for keeping a constant welding current through the workpieces 20 and 22.

During a welding operation, the present resistance welding control apparatus performs the contant-current control while at the same time measuring the effective value of the welding current I and the change of resistance ΔR across the welding electrodes 20 and 22. CPU 100 computes the effective value of the welding current I from the welding current signal [qi] supplied from toroidal coil 30 through the waveform recovery circuit 32 and A/D converter 34.

Current intergrator 42, voltage integrator 44, sample-and-hold circuits 46 and 48, A/D converters 50 and 52, and CPU 100 are arranged so as to measure a change of resistance ΔR across the welding electrodes 20 and 22 for each cycle or each half cycle.

The current integrator 42 receives the welding current signal qi from the waveform recovery circuit 32. In response to the timing signal TR from turn-on/off detector 40, the current integrator 42 integrates the welding current signal qi in positive polarity with respect to time for each cycle, thus generating a current integral signal Si(FIG. 2(E)). In response to the timing signal TSH from turn-on/off detector 40, the sample-and-hold circuit 46 samples and holds the value [Sin] (n=1, 2, . . . ) of the current integral signal Si at the time the positive welding current I becomes zero in each positive cycle (see FIG. 2 (E)). A/D converter 50 converts the current S/H value [Sin] to a corresponding digital signal [DSin] and supplies it to CPU 100.

The welding electrodes 20 and 22 are connected to the voltage integrator 44 through wires 43 and 45. Thus, during a welding operation, the voltage v (FIG. 2(C)) across the welding electrodes 20 and 22 is inputted to the voltage intergrator 44. The voltage integrator 44, in response to the timing signal TR from turn-on/off detector 40, integrates the voltage v for each time interval during which a posive welding current I flows, thus generating a voltage integral signal Sv(FIG. 2(F)).

In response to the timing signal TSH from the turn-on/off detector 40, the sample and hold circuit 48 samples and holds the value [Svn] (n=1, 2, . . . ) of the voltage integral signal Sv at the time of the stop of the positive welding current I becomes zero in each cycle (see FIG. 2(F)). The A/D converter 52 converts the voltage integral value [Svn] to a corresponding digital signal [DSvn] and supplies it to CPU 100. Due to induced voltage in the inductance of the resistance welding machine, the voltage v across the welding electrodes inverts its polarity in the latter half of every half cycle of the welding current. However, the induced voltage occur in both polarities almost equally. Thus, integrating the voltage v cancels the induced voltage component so that the voltage integral value [Svn] indicates a correct integral value of the net voltage across the welding electorodes.

In accordance with the program stored in memory 54, CPU 100 computes the resistance $R_n$ across the welding electrodes for each cycle by dividing the voltage S/H value [Svn] by the current S/H value [Sin]. Then CPU 100 computes the difference of resistance ΔR (=$R_n$–$R_{n-1}$) between the resistance of the present cycle and that of the previous cycle. In general, when splash has occured the resistance across the welding electrodes drops abruptly, so that a relatively large difference ΔR of resistance is detected. In this embodiment, the maximum of the difference ΔR of each cycle is to be regarded as the change of resistance of the present welding operation.

CPU 100 counts the number of the welding operations N involving the welding electrodes 20 and 22. The number N is incremented by one to N=N+1 each time when a welding operation ends.

In this manner, for each welding operation, the embodiment detects the change of resistance ΔR, measures effective value of the welding current I and counts the number of welding operations N. Then, the embodiment performs Fuzzy reasoning based on these three factors ΔR, I and N to correct or optimize the set value of welding current for the next welding operation.

Fuzzy reasoning of the embodiment will now be described. The embodiment employs a typical Fuzzy reasoning, called Max-Min method.

Figure 3:
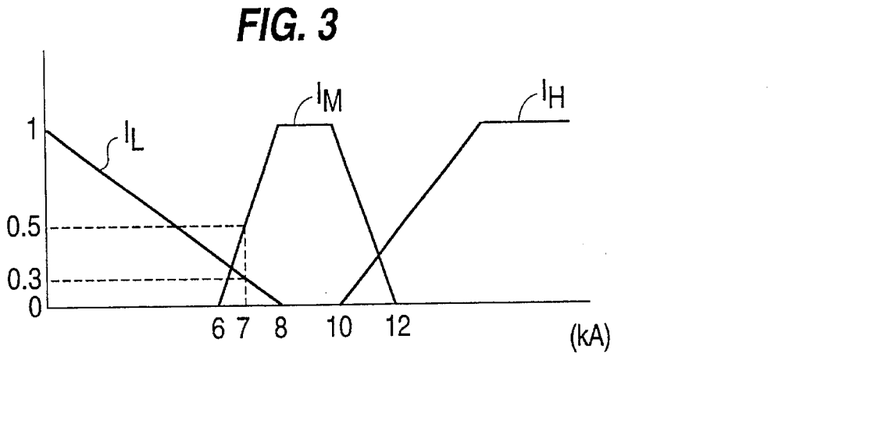
FIG. 3 is a diagram showing an example of antecedent membership functions set for respective degrees of a welding current, used in Fuzzy reasoning in accordance with the invention.

To this end, the welding current I is classified into three groups according to its degrees, e.g., "small", "middle" and "large." A plurality of antecedent membership functions $I_L$, $I_M$ and $I_H$ are set for the respective degrees of the welding current, as shown in FIG. 3.

Figure 4:
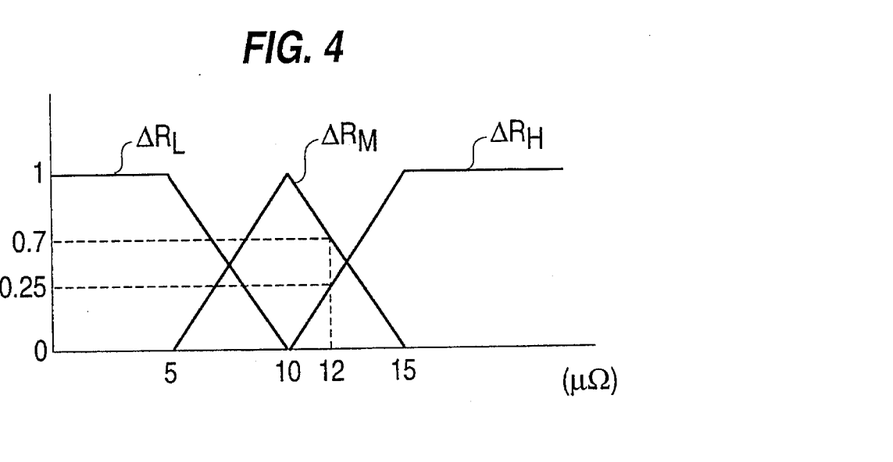
FIG. 4 is a diagram showing an example of antecedent membership functions set for respective degrees of a change of resistance across welding electrodes, used in Fuzzy reasoning in accordance with the invention.

The change of resistance ΔR across the welding electrodes 20 and 22 is also classified into three groups according to its degrees, e.g., "low", "middle" and "high." A plurality of antecedent membership functions $ΔR_L$, $ΔR_M$ and $ΔR_H$ are set for the respective degrees of the change of resistance, as shown in FIG. 4. These membership functions may be changed with respect to thickness and material of workpieces 24, 26.

Figure 5:
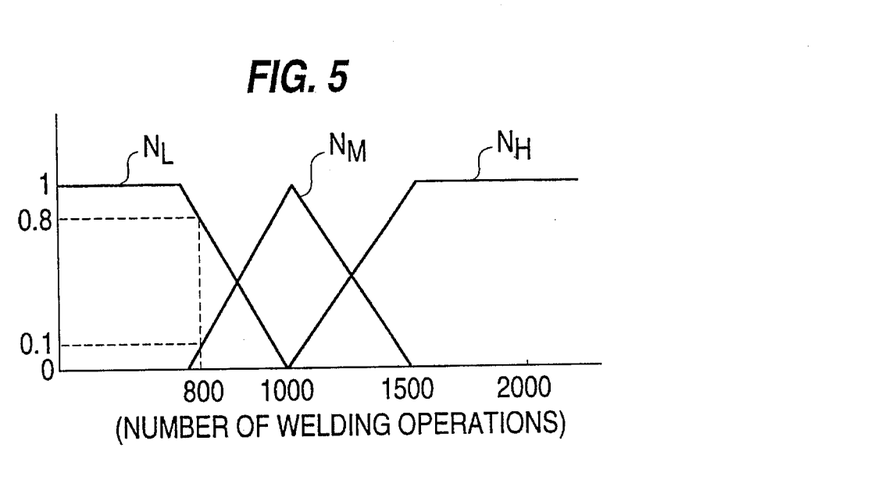
FIG. 5 is a diagram showing an example of antecedent membership functions set for respective degrees of a number of welding operations used in Fuzzy reasoning in accordance with the invention.

The number of welding operations N involving the welding electrodes 20 and 22 is also classified into three groups according to its degrees, e.g., "small", "middle" and "large." A plurality of membership functions $N_L$, $N_M$ and $N_H$ are set for the respective degrees of the number of welding operations as shown in FIG. 5. The above is the setting of antecedent membership functions.

Figure 6:
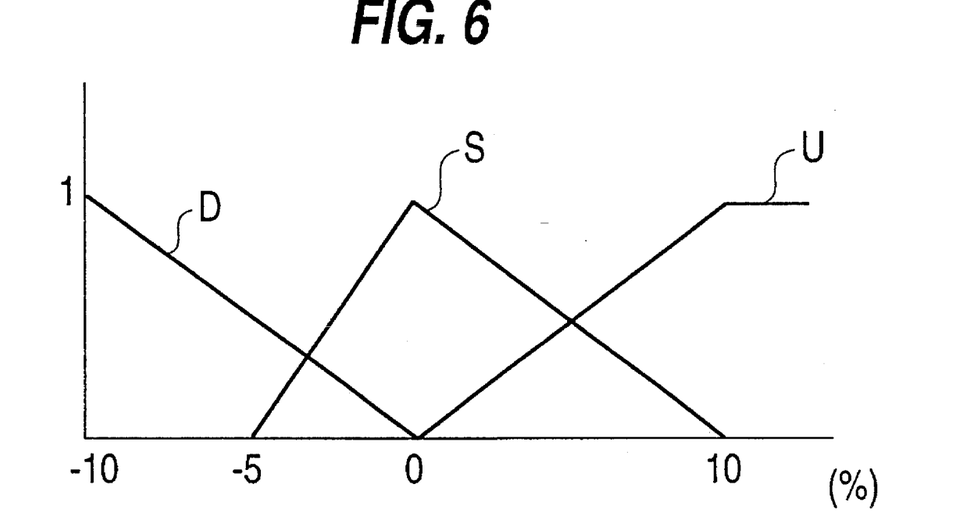
FIG. 6 is a diagram showing an example of conclusion membership functions set for respective degrees of a change rate of a set value of welding current, used in Fuzzy reasoning in accordance with the invention.
Figure 7:
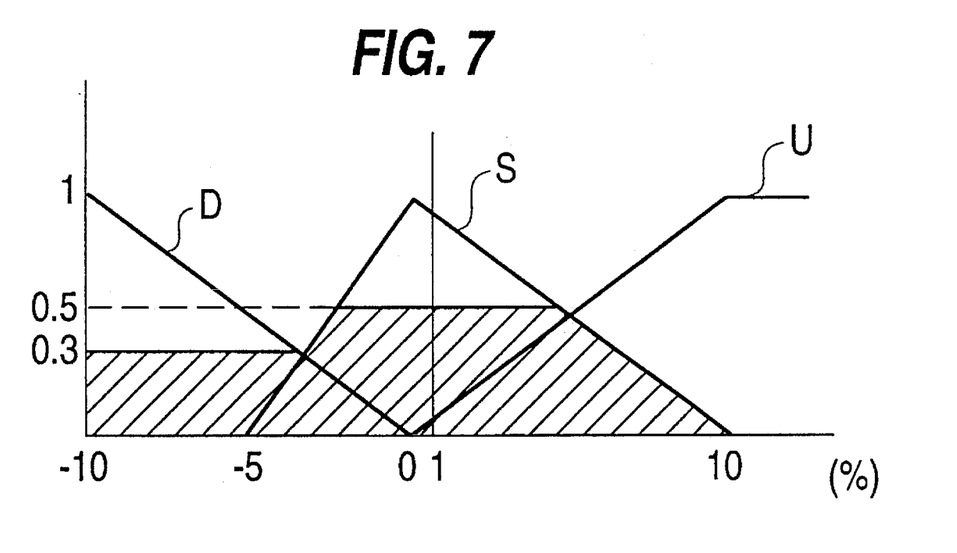
FIG. 7 is a diagram showing computation of the center of gravity, used in Fuzzy reasoning in accordance with the invention.

The change (correction) rate of the set value of welding current Is is also classified into three groups according to its degrees, e.g., "up", "keep" and "down." A plurality of membership functions D, S and U are set for the respective degrees of the change rate of the set value of welding current, as shown in FIG. 6. These membership functions D.S and U are conclusion membership functions.

Figure 8:
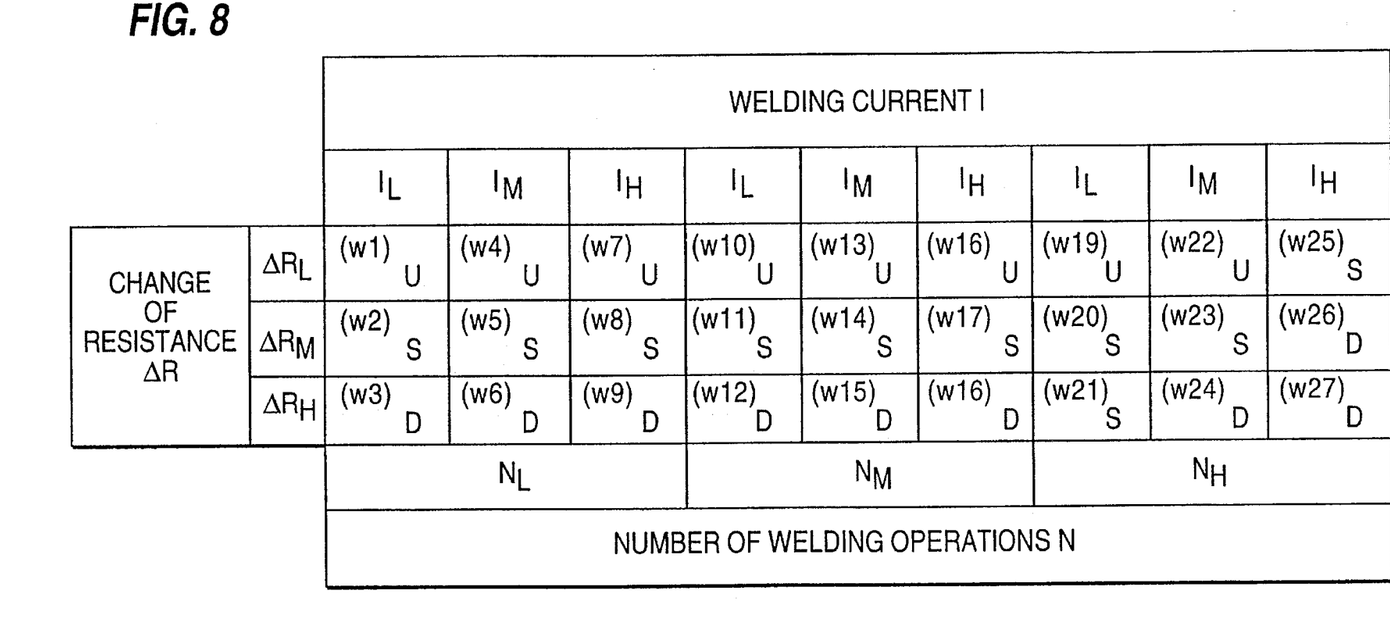
FIG. 8 is a table showing control rule set in Fuzzy reasoning in accordance with the invention.

FIG. 8 shows the control rule set used in the Fuzzy reasoning of the embodiment. The control rule set provides the relationship between the antecedent and conclusion membership functions. In FIG. 8, there are three (antecedent) input variables of ΔR, I and N. Each input is mapped into three Fuzzy sets or degrees ($ΔR_L$, $ΔR_M$ and $ΔR_H$) for ΔR, ($I_L$, $I_M$, $I_H$) for I and ($N_L$, $N_M$, $N_H$) for N. Thus, there are 27 control rules W1–W27 in total and each control rule has a Fuzzy value of a conclusion membership function U (up), S (keep) or D (down). For example, the first control rule W1 says that if the change of resistance ΔR across the welding electrodes is small ($ΔR_L$), the welding current I is low ($I_L$), and the number of welding operations N is small ($N_L$), then raise the set value of welding current Is(U). The twenty fifth control rule W25 says that if the change of resistance ΔR across the welding electrodes is small ($ΔR_L$), the welding current I is high ($I_H$), and the number of welding operation N is large ($N_H$), then keep the set value of welding current (S).

The setting device 36 inputs the control rule settings together with the setting of the antecedent and conclusion membership functions to CPU 100 to store in the memory 54.

Figure 9:
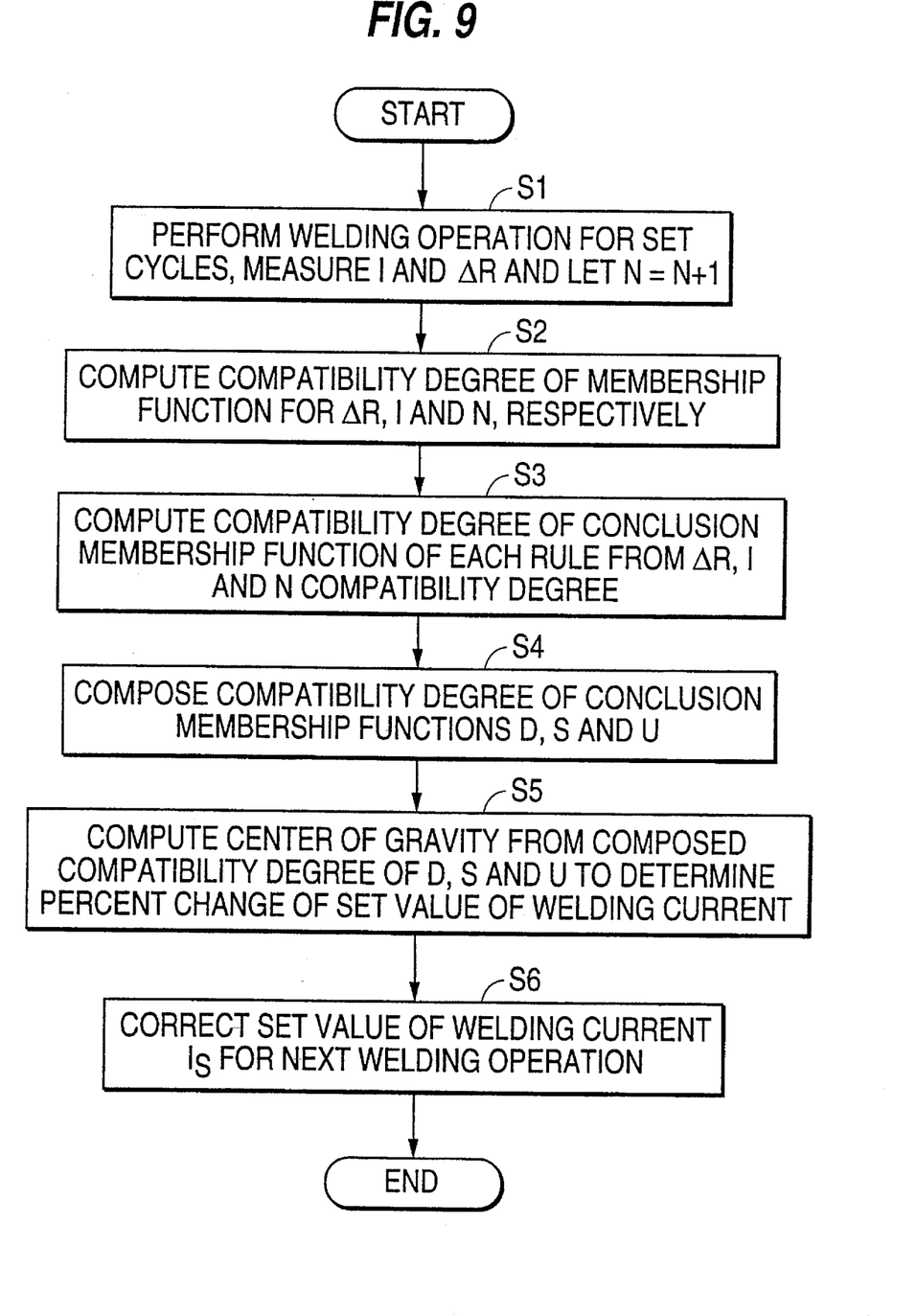
FIG. 9 is a flowchart showing the operation of the control (CPU) in accordance with the invention.

FIG. 9 is a flow chart showing an execution process of CPU 100 of the embodiment.

During a welding operation, CPU 100 performs the constant current control while measuring the welding current I (effective value) and the representative value (maximum) of the change of resistance ΔR across the welding electrodes, and then it increments the number of welding operations N by one, as shown in step S1.

After the present welding operation, CPU 100 maps the measured ΔR, I and N into matching or compatibility degree of respective antecedent membership functions (S2). For example, with I=7 kA, ΔR=12 μΩ and N=600, the compatibility degrees of the membership functions $I_L$, $I_M$ are $I_H$ are 0.3, 0.5 and 0, respectively, according to FIG. 3. ΔR of 12 μΩ is mapped into "0" as compatibility degree of $ΔR_L$, "0.7" as $ΔR_M$ compatibility degree and "0.25" as $ΔR_H$ compatibility degree according to FIG. 4. N of 600 yields "0.8", "0.1" and "0" as compatibility degrees of $N_L$, $N_M$ and $N_H$, respectively, according to FIG. 5.

Then CPU 100 computes or composes compatibility degree of the conclusion membership function (FIG. 6) of each control rule from the compatibility degrees of its antecedent membership functions (0, 0.7, 0.25) for ΔR, (0.3, 0.5, 0) for I and (0.8, 0.1, 0) for N (S3). This is done by selecting the minimum compatibility degree of the antecedent membership function in each control rule (FIG. 8) according to the Max-Min method.

For example, the first control rule W1 is processed as follows:

$$U = I_L * ΔR_L * N_L$$
$$= 0.3 * 0 * 0.8$$
$$= 0$$

Thus, the compatibility degree of conclusion U of rule W1 is 0.

The fifth control rule W5 is processed as follows:

$$S = I_M * ΔR_M * N_L$$
$$= 0.5 * 0.7 * 0.8$$
$$= 0.5$$

Thus, the compatibility degree of conclusion S of rule W5 is 0.5.

The remaining control rules W2–W4 and W6–W27 are processed similarly, thus yielding the compatibility degree of their conclusion membership function.

Then CPU 100 composes the compatibility degrees of the conclusion membership functions U, S and D (S4). This is done by selecting the maximum compatibility degrees $U_{Max}$, $S_{Max}$ and $D_{Max}$ of the conclusion membership functions U, S and D according to the Max-Min method.
This yields:
$U_{Max}=0$
$S_{Max}=0.5$
$D_{Max}=0.3$ Next, CPU 100 computes the percent change of the set value of welding current as operation value from the composed compatibility degree of U, S and D according to the center of gravity defuzzification method (S5). Truncating the conclusion membership functions U, S and D with their composed compatibility degree of 0(=$U_{Max}$), 0.5(=$S_{Max}$) and 0.3(=$D_{Max}$) defines the hatched area in FIG. 6. Computing the center of gravity of the area with respect to the horizontal axis yields approximately one percent of increment of the set value of welding current.

Then CPU 100 corrects the set value of welding current Is with the computed percent change and loads it into the memory 54 (S6). The stored welding current data is used as the set value of welding current for the next welding operation.

In this manner, the embodiment monitors the welding current I, change of resistance ΔR across welding electrodes, and the number of welding operations N as variables, and corrects the set value of welding current for the next welding operation based on the monitored values according to the Fuzzy reasoning. With the antecedent or conclusion membership function characteristics or control rules, the set value of welding current is finely and adaptively corrected or optimized automatically. The embodiment does not require a skilled operator, yet assures satisfactory weld quality without splash or separation.

Among the monitored values I, ΔR and N, ΔR has been found the most important variable in determining the set value of welding current. Therefore, using the Fuzzy reasoning, percent change of the set value of welding current can be determined from the measured change of resistance ΔR only, or from ΔR and measured I, or from ΔR and N. Other variables such as the pressure applied to the welding electrodes, and displacement of the electrodes may be added as variables while setting their membership functions. The Max-Min method and center-of-gravity method stated above are only illustrative. They may be replaced by any other Fuzzy reasoning and/or defuzzification, such as the algebraic product-sum method, area method or means height method.

Figure 10:
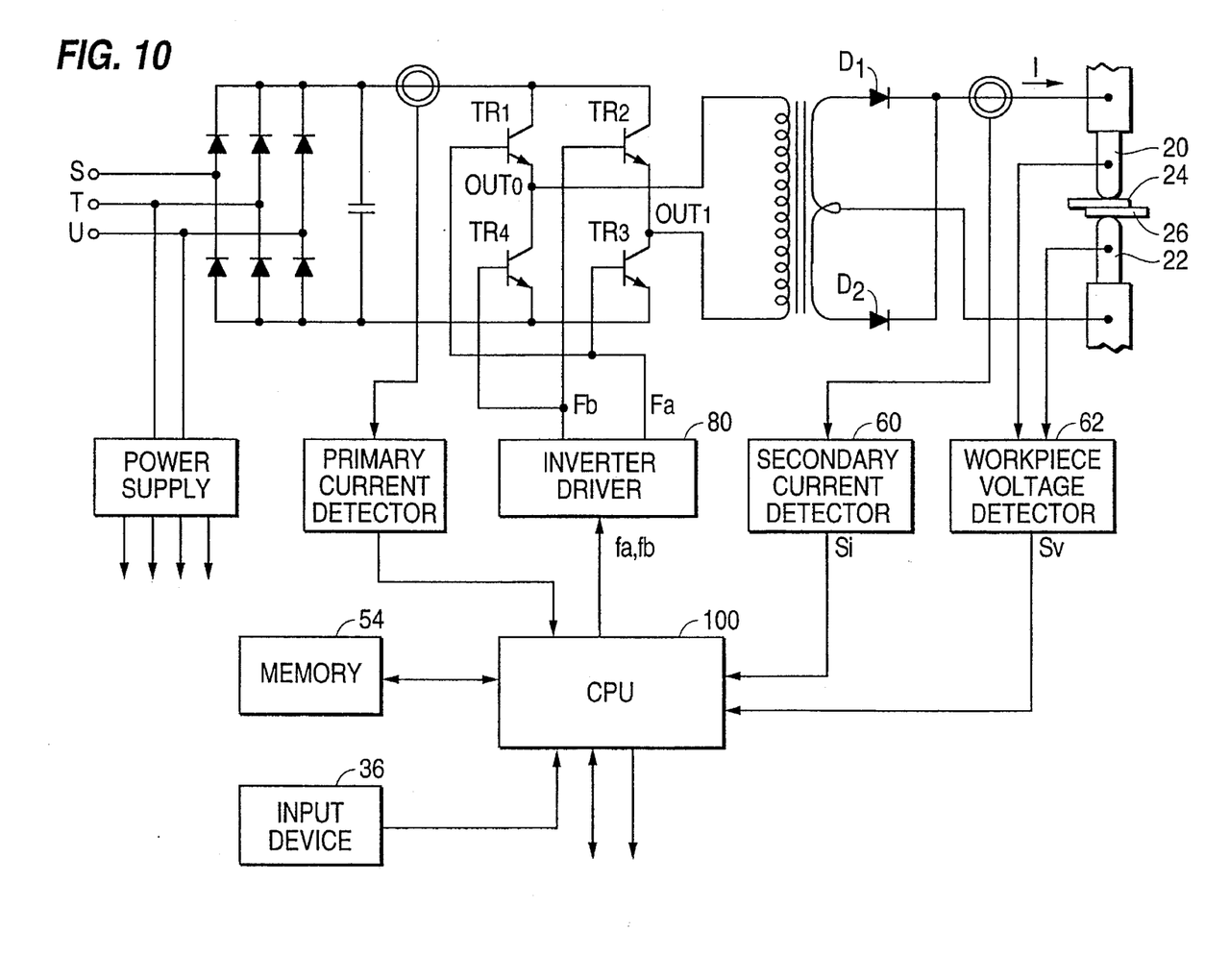
FIG. 10 is a diagram showing an arrangement of an inverter resistance welding machine together with a control to which the control method of the invention applies.

The embodiment applies to the resistance welding control of a single phase AC resistance welding machine. The invention can also apply to the resistance welding control of an inverter resistance welding machine shown in FIG. 10. In FIGS. 1 and 10, corrresponding components are designated by like numerals or symbols. The control apparatus of FIG. 10 can measure the welding current from either the primary or secondary circuit. CPU 100 computes the change of resistance across the welding electrodes, using the output signal Si from the secondary current detector 60 and the output signal Sv from the workpiece voltage detector 62. CPU 100 also counts the number of welding operations.

The present method for controlling resistance welding performs Fuzzy reasoning from monitored values of each welding operation, thus automatically correcting the set value of welding current for the next welding operation. Thus, the method of the invention does not require a skilled operator, yet assuring nugget and satisfactory weld quality with minimized splash.

What is claimed is:

1. A method for controlling resistance welding, comprising the steps of:

setting a plurality of antecedent membership functions for respective degrees of a change of resistance across welding electrodes under welding operation;

setting a plurality of conclusion membership functions corresponding to said antecedent membership functions for respective degrees of a change rate of a set value of welding current;

detecting said change of resistance across said welding electrodes during a welding operation; and correcting said set value of welding current for the next welding operation based on said detected change of resistance in accordance with said antecedent membership functions and said conclusion membership functions.

2. A method for controlling resistance welding, comprising the steps of:

setting a plurality of first antecedent membership functions for respective degrees of a change of resistance across welding electrodes under welding operation;

setting a plurality of second antecedent membership functions for respective degrees of a change rate of a welding current under welding operation;

setting a plurality of conclusion membership functions corresponding to said first and second antecedent membership functions for respective degrees of a change rate of a set value of welding current;

detecting said change of resistance across said welding electrodes during a welding operation;

measuring said welding current during said welding operation; and correcting said set value of welding current for the next welding operation based on said detected change of resistance and said measured welding current in accordance with said first and second antecedent membership functions and said conclusion membership functions.

3. A method for controlling resistance welding, comprising the steps of:

setting a plurality of first antecedent membership functions for respective degrees of a change of resistance across welding electrodes;

setting a plurality of second antecedent membership functions for respective degrees of a number of welding operations involving said welding electrodes;

setting a plurality of conclusion membership functions corresponding to said first and second antecedent membership functions for respective degrees of a change rate of a set value of welding current;

detecting said change of resistance across said welding electrodes during a welding operation;

counting said number of welding operations involving said welding electrodes; and correcting said set value of welding current for the next welding operation based on said detected change of resistance and said counted number of welding operations in accordance with said first and second antecedent membership functions and said conclusion membership functions.

4. A method for controlling resistance welding, comprising the steps of:

setting a plurality of first antecedent membership functions for respective degrees of a change of resistance across welding electrodes under welding operation;

setting a plurality of second antecedent membership functions for respective degrees of a welding current under welding operation;

setting a plurality of third antecedent membership functions for respective degrees of a number of welding operations involving said welding electrodes;

setting a plurality of conclusion membership functions corresponding to said first, second and third antecedent membership functions for respective degrees of a change rate of a set value of welding current;

detecting said change of resistance across said welding electrodes during a welding operation;

measuring said set value of welding current during said welding operation;

counting said number of welding operations involving said welding electrodes, and correcting said set value of welding current for the next welding operation based on said detected change of resistance, said measured welding current and said counted number of welding operations in accordance with said first, second and third antecedent membership functions and said conclusion membership functions.

* * * * *

UNITED STATES PATENT AND TRADEMARK OFFICE
CERTIFICATE OF CORRECTION

PATENT NO. : 5,591,355
DATED : January 7, 1997
INVENTOR(S) : Sakae ISHIKAWA et al.

It is certified that error appears in the above-indentified patent and that said Letters Patent is hereby corrected as shown below:

Column 1, before the "SUMMARY OF THE INVENTION", insert the following:

--BACKGROUND OF THE INVENTION

The present invention relates to a method for controlling resistance welding.

In the resistance welding, a constant-current control including a feedback loop has been mostly employed which keeps a constant welding current passing through a workpiece. This is the case even for currently prevailing inverter resistance welding machines. Primary reasons are (a) a welding current is one of the major conditions for resistance welding and (b) a feedback loop is easy to implement by measuring a welding current with a toroidal coil or current transformer.

Optimization of a welding current setting is very important to resistance welding. Repeated resistance welding operations cause wear of the tip of a welding electrode, enlarging the contact area with the workpiece. Consequently, as the number of welding operations increases, a reduced density of welding current is applied to the workpiece with

UNITED STATES PATENT AND TRADEMARK OFFICE
CERTIFICATE OF CORRECTION

PATENT NO. : 5,591,355
DATED : January 7, 1997
INVENTOR(S) : Sakae ISHIKAWA et al.

It is certified that error appears in the above-indentified patent and that said Letters Patent is hereby corrected as shown below:

the fixed set value of welding current. This eventually results in an unsatisfactory weldment (e.g., separation of weld zones). In this regard, the prior art employs a step-up control which steps up the set value of welding current per a predetermined number (e.g., 1000) of welding operations.

The step-up control is, however, a coarse control which progressively increases the set value of welding current per the predetermined number of welding operations. It typically selects a large set value of welding current or step-up rate to avoid the separation. However, an excessive welding current generates excessive Joule heat in the workpiece which is thus subject to splashing. Such splash must be minimized since a considerable amount of splash not only degrades weld quality but also damages welding electrodes and worsens the operational environment. The prior art relies on the

UNITED STATES PATENT AND TRADEMARK OFFICE
CERTIFICATE OF CORRECTION

PATENT NO. : 5,591,355
DATED : January 7, 1997
INVENTOR(S) : Sakae ISHIKAWA et al.

It is certified that error appears in the above-indentified patent and that said Letters Patent is hereby corrected as shown below:

experience or intuition of a field operator for setting the step-up rate, so that it is difficult to maintain the desired weld quality without a highly skilled operator who can do the proper setting.--

Signed and Sealed this

Twenty-sixth Day of August, 1997

Attest:

BRUCE LEHMAN

Attesting Officer

Commissioner of Patents and Trademarks